United States Patent [19]

Dotsko et al.

[11] 4,354,737

[45] Oct. 19, 1982

[54] VARIABLE GAIN SCREEN PERMITTING OFF-AXIS VIEWING WITH IMAGE BRIGHTNESS REMAINING CONSTANT

[75] Inventors: Martin Dotsko; Robert E. Klemm, both of Binghamton; David L. Peters, Whitney Point, all of N.Y.

[73] Assignee: The Singer Company, Binghamton, N.Y.

[21] Appl. No.: 191,968

[22] Filed: Sep. 29, 1980

[51] Int. Cl.³ .............................................. G03B 21/56
[52] U.S. Cl. .................................... 350/117; 350/125; 350/126
[58] Field of Search ........................ 350/125, 126, 117

[56] References Cited

U.S. PATENT DOCUMENTS

| Re. 29,091 | 12/1976 | DePalma et al. | 350/125 |
| 2,381,614 | 8/1945 | Moller et al. | 350/125 |
| 2,934,997 | 5/1960 | Harkness | 350/126 |
| 3,383,153 | 5/1968 | Vetter | 350/126 |
| 3,639,037 | 2/1972 | Fukushima | 350/126 |
| 4,068,922 | 1/1978 | Dotsko | 350/126 |

FOREIGN PATENT DOCUMENTS

| 52-45332 | 9/1977 | Japan | 350/126 |
| 457020 | 11/1936 | United Kingdom | 350/125 |

*Primary Examiner*—Monroe H. Hayes
*Attorney, Agent, or Firm*—Jeff Rothenberg; Stephen C. Kaufman

[57] ABSTRACT

The invention is a variable gain non-Lambertian screen surface (12) for employment in a visual display system. The screen surface provides constant image brightness, independent of changes in viewing angle (22). It is therefore suitable for off-axis viewing. The screen gain continuously varies from a magnitude of one to infinity at different portions on the screen surface in such a manner that the equivalent gain preceived by an off-axis viewer (16) corresponds to the viewer perceiving constant image brightness, independent of changes in the viewing angle.

4 Claims, 3 Drawing Figures

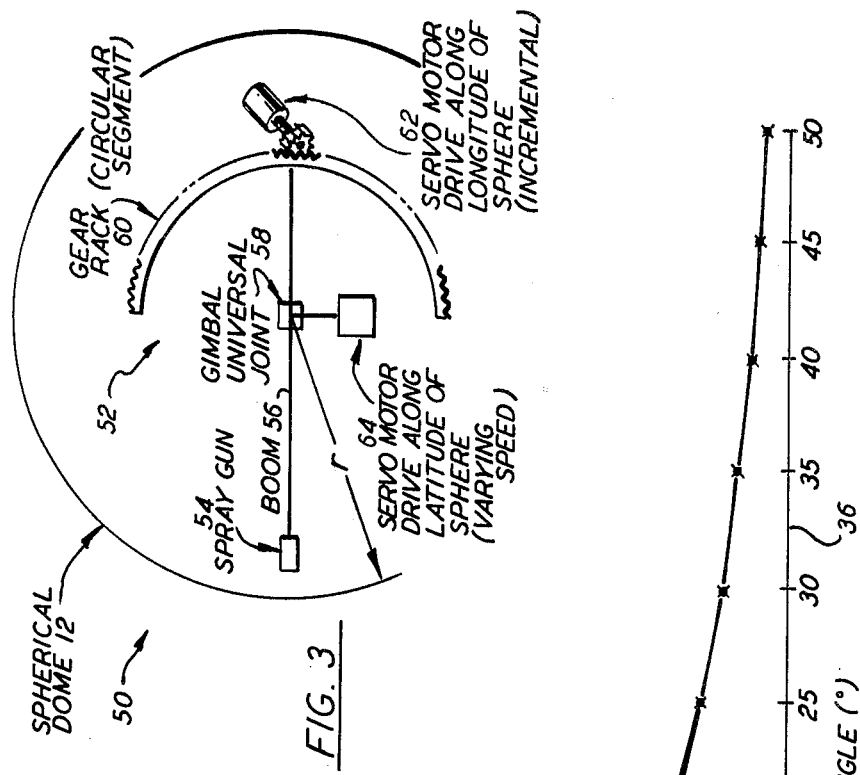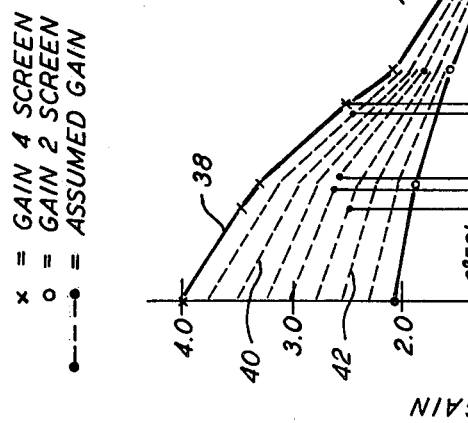

VARIABLE GAIN SCREEN PERMITTING OFF-AXIS VIEWING WITH IMAGE BRIGHTNESS REMAINING CONSTANT

The Government has rights in this invention pursuant to Contract F33657-78-C-0592 awarded by the Department of the Air Force.

TECHNICAL FIELD

The present invention relates to projection screens and more particularly, to a variable gain projection screen for use in visual display systems.

BACKGROUND ART

Visual display systems are in widespread use. They are particularly valuable in the field of flight simulation. Flight simulation is a method of training aircraft personnel. In a simulator the trainee is placed in a realistically recreated aircraft environment designed such that the trainee, without leaving the ground, feels that he is in and operating an actual aircraft. An important element used to create this realism is the visual display system which provides the trainee with an out-of-the-window scene of the external environment.

The visual display system may include a front projection screen. This type of screen is used when a projector, and a trainee who observes the projected image, are located on the same side of the projection screen.

Screens for exhibiting projected images typically comprise a support structue plus some overlaying coating which comprises a screen surface. The present invention is directed to features of the screen surface.

A typical visual display system in flight simulation utilizes a front projection screen that comprises a segment of a spherical dome. The trainee, the projector, and the screen center of curvature, in the general case, are positioned at different interior locations of the dome. This displacement of the trainee's eye position from the location of the projector and the screen center of curvature produces a condition referred to as off axis viewing.

In order to provide the trainee with realistic visual cues, it is desirable to provide a projection screen surface which permits off-axis viewing with image brightness perceived by the trainee remaining constant over the whole screen surface.

Image brightness is a critical factor in the selection of a projection screen. Image brightness, or luminance, refers to a sensation in the consciousness of a human observer that corresponds to a visual sensation of more or less light i.e., bright, light, brilliant, dim, or dark. Image brightness is measured at the eye point.

One way to satisfy the condition that the trainee be provided with a screen surface which permits off-axis viewing with image brightness perceived by the trainee remaining constant over the whole screen surface, is to employ Lambertian surfaces. A Lambertian surface is a perfectly diffusing surface for which the image brightness or luminance is the same for every angle of observation. Therefore, the trainee perceives the same image brightness for any change in viewing angle defined by the trainee's eye line-of-sight.

Lambertian surfaces are perfectly diffuse and therefore reflect one hundred percent of the light incident on them. A unit, called the foot-lambert, is defined to take advantage of this circumstance. By definition, one foot-lambert is the brightness of a perfectly diffuse, perfectly reflecting surface illuminated by one foot-candle. Equivalently, a Lambertian surface is said to have a gain of one, since the brightness in foot-lamberts is numerically equal to the value of the illumination in foot-candles.

The gain of any screen surface is a measure of the magnitude of the image brightness. Gain magnitudes comprise a gain magnitude of one, for Lambertian surfaces which are perceived as white, up to infinity for other non-Lambertian surfaces. For non-Lambertian surfaces of gains greater than one, the gain is a measure of the image brightness of the screen surface measured along a normal to the surface. The eye is sensitive to changes in gain that correspond to absolute differences in gain of one or more. For example, the eye can perceive a change in image brightness that corresponds to a first screen surface with a gain of e.g., 2.5 compared to a second screen surface with a gain of 3.5.

Lambertian surfaces help to provide realistic visual cues to a trainee, since they enable the trainee to perceive a constant image brightness, with a gain of one, for every angle of observation. Lambertian surfaces thus provide constant image brightness for the case where the visual display system requires off-axis viewing and a gain of one. Nevertheless, in order to increase the realism of the visual display system, it is desirable to increase the magnitude of the luminance or image brightness. An increase in realism may be achieved by increasing the gain (which is a measure of image brightness along the normal to the screen surface).

A problem is presented, however, if the gain of the screen is fixed at a value that is not one. A screen surface that does not have a gain of one is not a Lambertian surface. For non-Lambertian surfaces the perceived brightness depends on the angle of observation or viewing angle. Since the perceived brightness depends on the viewing angle, the trainee subjectively believes that the fixed gain, which is measured from the normal to the surface, changes in correspondence to changes in the viewing angle. For example, a non-Lambertian surface of fixed gain four (4) as measured from the normal, corresponds to image brightness at the eye point for a viewing angle of e.g., 10 degrees, as an equivalent gain of only 2.5. Thus, with a non-Lambertian surface of fixed gain as measured from the normal, a change in viewing angle results in image brightness measured at the eye point that corresponds to only an equivalent gain. In general, as the viewing angle increases, the equivalent gain decreases and hence there is perceived diminution of image brightness.

Desirable visual cues correspond to the trainee's perception of constant image brightness, independent of changes of the viewing angle. The situation of diminished brightness as a function of viewing angle therefore critically detracts from the realism of the visual display system.

This problem has not been adequately addressed by the prior art. Much attention has been focused on using Lambertian surfaces. These surfaces are satisfactory for off-axis viewing, insofar as they provide image brightness with a gain of one. However, Lambertian surfaces do not have a sufficiently high gain for many applications. Surfaces which do have a sufficiently high fixed gain are non-Lambertian. These surfaces only provide an equivalent gain at eye point. The equivalent gain, moreover, changes from the fixed gain, as measured from the screen surface normal, according to changes in the viewing angle.

What is required in a flight simulation visual display system, where there is off-axis viewing, is a screen surface of gain greater than one; for this surface, constant image brightness at eye point should be maintained independent of changes in the viewing angle.

DISCLOSURE OF THE INVENTION

Accordingly, a primary object of the present invention is to provide a constant brightness non-Lambertian projection screen.

Another object of this invention is to permit off-axis viewing with image brightness remaining constant at different viewing angles.

It is still a further object to provide a variable gain screen surface, the gain of which varies in such a manner that perceived image brightness is independent of viewing angle.

In accordance with the present invention, an improved non-Lambertian screen surface is provided that permits off-axis viewing with image brightness remaining constant, independent of changes in the viewing angle. The improvement comprises means to continuously vary the screen gain across the screen surface. The gain varies in such a manner to provide an off-axis viewer with a perceived image brightness which is constant, independent of changes of the viewing angle.

BRIEF DESCRIPTION OF DRAWINGS

These and other features of the present invention will be more clearly understood from a consideration of the following description taken in connection with the accompanying drawings in which:

FIG. 2 is a plot of image brightness measured from the eye point verus viewing angle for a family of gain curves;

FIG. 3 is a generalized view showing the production of a variable gain screen;

BEST MODE FOR CARRYING OUT THE INVENTION

Figure 1:
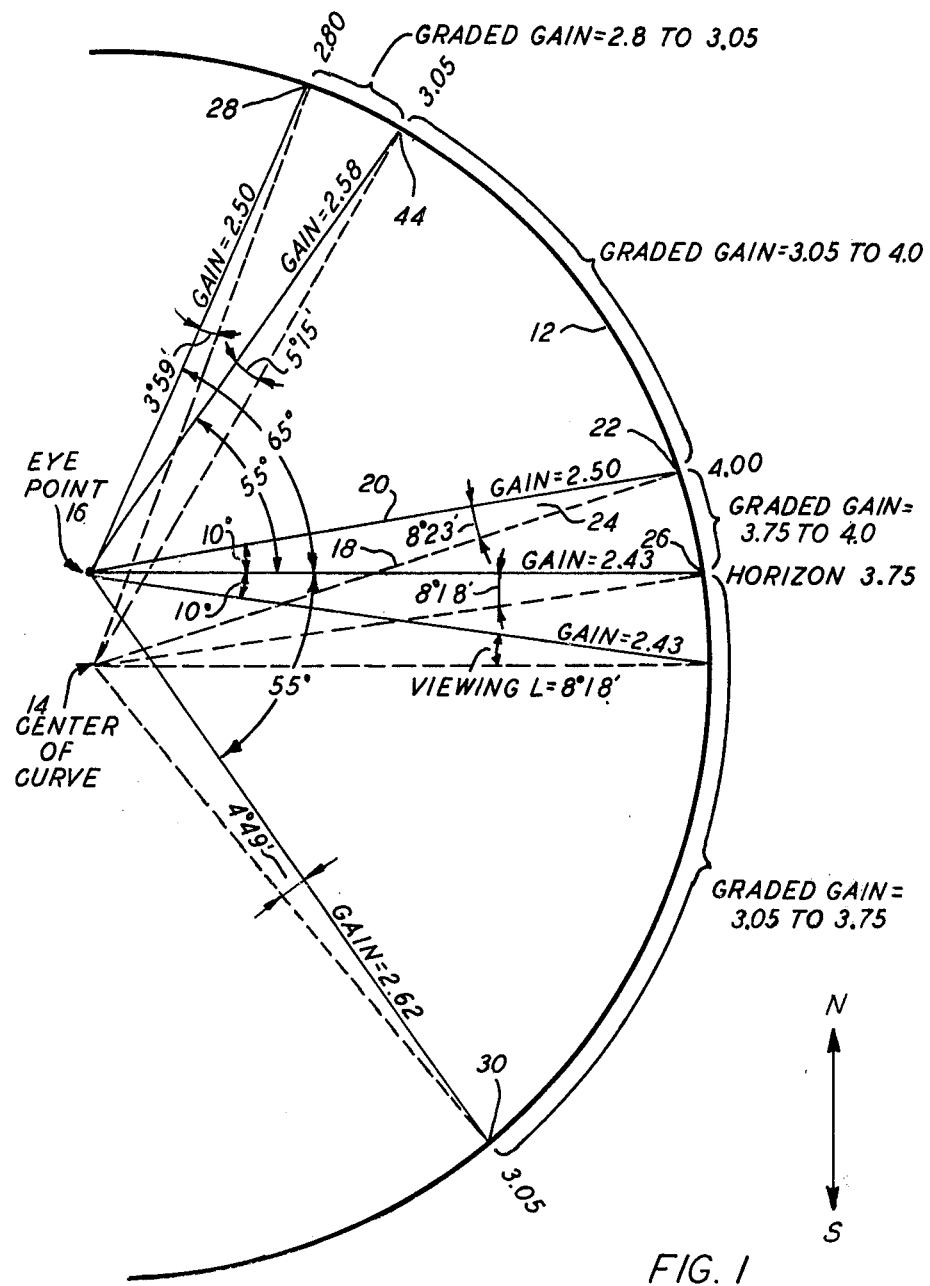
FIG. 1 shows a variable gain screen for a visual display system.

For purposes of illustration of the principles of the present invention and for typical employment in flight simulation, a variable gain screen surface is shown in FIG. 1, indicated generally by numeral 10.

The preferred embodiment employs a spherically shaped non-Lambertian screen surface 12. A spherical shape has symmetries that allow for simplification in the presentation of the principles of the present invention. For example, the gain remains constant along the azimuth (not shown) and varies along the vertical direction (shown by arrows labeled North and South). In the general case, which will be described more fully hereinafter, parabolic, flat, or other shapes may be employed.

In the preferred embodiment, off-axis viewing results from placing the eye point 16 of the trainee directly above the center of curvature 14 of the screen. The projector (not shown) is located at the center of curvature.

The trainee is positioned so that his head movement is relatively limited. The trainee's line-of-sight "views" the image from the projector at different points on the screen surface. Ray 20, for example, corresponds to a line-of-sight that intersects the screen surface at point 22 and thus "views" ray 18, which emanates from the projector. The angle formed by the intersection of rays 18 and 20 is called a viewing angle. As the trainee moves his line-of-sight, the viewing angle changes in value. For example, at point 22, the viewing angle is 8° 23'; at point 28, the viewing angle is 3° 59'.

Desirable visual cues correspond to the trainee's perception of constant image brightness, independent of changes in the value of the viewing angle. As shown above, constant image brightness cannot be provided when non-Lambertian surfaces of fixed gain are employed in off-axis viewing.

It is at this point that the present invention radically departs from the prior art by employing a varying screen gain, non-Lambertian surface. The screen gain continuously varies along the screen surface in such a manner that the trainee perceives constant image brightness, regardless of changes in viewing angle.

For example, in flight simulation it is desirable to maintain constant image brightness that would correspond to a screen surface having a fixed gain of 2.5 for all viewing angles. Using the principles of the present invention, the screen gain is varied in such a manner that the image brightness perceived by the trainee corresponds to an equivalent gain of 2.5 for any value of the viewing angle. Thus, between points 22 and 44, the surface comprises a reflective material having a gain that gradually changes from 3.05 to 4.0. By varying the screen gain in this manner, the trainee continuously perceives an image brightness equivalent to a gain of 2.5 and hence constant image brightness, independent of the viewing angle.

In this particular example, the different gain values between points on the screen surface are supplied from information provided by FIGS. 1 and 2. FIG. 2 is a plot 32 of image brightness 34 measured from the eye point versus viewing angle 36 for a family of gain curves.

The gain values just presented are derived by using the information in FIGS. 1 and 2 in the following manner. Point 22 in FIG. 1 corresponds to a first location on the screen surface having a viewing angle of 8° 23'. With reference to FIG. 2, the intersection of 8° 23' on the viewing angle abscissa with the desired image brightness that corresponds (in our example) to an equivalent gain of 2.5 on the ordinate, is the 4.0 gain curve. Consequently, point 22 comprises a reflective material having a gain of 4.0. The trainee therefore perceives a brightness image at point 22 that corresponds to an equivalent gain of 2.5. The entire screen surface is thus evaluated, so that for any point on the screen surface, the equivalent gain perceived by the off-axis trainee is 2.5.

It is observed that for the preferred embodiment of the spherical screen surface, the gain increases with uniform gradations. For example, the arc defined by points 30, 26 has a graded gain of 3.05 to 3.75. Similarly, the arc 22, 26 has a graded gain of 3.75 to 4.0; the arc 22, 44 has a graded gain of 3.05 to 4.0.

The uniform increases of the gain for the spherical screen surface suggests that screen gain can be graded into patterns over different arc sections. It is desirable to detect patterns. The recognition of a pattern reduces the number of FIG. 1 computations of viewing angle and FIG. 2 computations of compensating gain values to restore constant image brightness. Further, the existence of patterns has utility in terms of broadening the application of the present invention. For example, the screen gain can remain substantially constant over one portion of the screen surface; contiguous portions however, have different screen gain magnitudes.

Although pattern recognition is desirable, it is often difficult to detect simple patterns. The difficulties in part derive from more complex visual display systems than heretofore described. For example, a visual display system in flight simulation (not shown) might comprise eight (8) projectors displaced from the screen center of curvature and positioned to project at 45° intervals around the dome. Ideally, each projector illuminates only a 45° section of the screen surface. In practice, however, the illumination from a first projector overlaps the illumination from a second projector. Because the projectors are positioned to project at 45° intervals, the viewing angles for each projector are different. Consequently the required gain at the points of overlap cannot be derived from the patterns suggested by either the first or second projectors alone.

Pattern recognition is also complicated because of the problem of stray light. Stray light is produced by a portion of light from a firt projector that does not reflect back towards the trainee's eye, but instead proceeds across the dome and strikes a different section of the screen surface. Stray light adds unwarranted luminance to a point of interest and tends to "wash out" or degrade the desired image. Stray light consequently tends to obliterate patterns.

Pattern recognition is further complicated due to variables in the calculation of the illumination from the projector. The variables include the distortion and transmission factors of the lens, the light fall-off characteristics of the light-valve raster, and the location and the orientation of the projector. Variations in the illumination from the projector manifest themselves as stray light. The variations in illumination from the projector therefore act to obliterate patterns.

Pattern recognition is therefore generally difficult to establish. When pattern recognition is difficult to establish, the principles of the present invention are applied empirically. An empirical approach involves first computing the required gain for each projector separately without the superimposed effects of stray light. Second, the required gain for stray light is computed.

A compromise gain value is derived from the first and second gain values. The compromise gain value at different locations on the screen surface ensures that the trainee perceives constant image brightness, independent of changes in the viewing angle.

FIG. 3 is a schematic illustration of an automated electrostatic spray machine 52 which can be advantageously used to construct the patterns of the screen gain of the preferred embodiment. It comprises a spray gun 54, a boom 56 connected to the spray gun, a gimbal universal joint 58 connected to the boom, a gear rack 60 connected to the boom, a first servo motor 62 for producing movement along meridians of longitude, and a second servo motor 64 for producing movement along parallels of latitude.

The spray gun is employed in this embodiment to control the magnitude of the gain. It does this by applying a different number of coats of lacquer upon a selected portion of the screen surface. In general, the smaller the number of coats of lacquer, the greater the screen gain. The determination of the number of spray coats to produce a given screen gain is described in the Dotsko patent, U.S. Pat. No. 4,068,922. As will be obvious to those skilled in the art, the lacquer coatings represent one of many reflective materials that may comprise the screen surface in order to provide the screen gain.

The principles of the present invention can be selectively employed to produce a variety of alternative embodiments. A first class of alternative embodiments comprises the case where the shape of the screen surface is varied. An example is provided by a screen surface which has a shape that is non-spherical. In particular, flat or paraboloid screen surface shapes are important secondary design shapes for employment in flight simulation. For non-spherical shapes, simple patterns of screen gain gradations are not easily discerned. Therefore, empirical methods are used to establish the variances of screen gain from a first to a second portion of the non-spherical screen shape, in order that the equivalent gain perceived by the off-axis trainee corresponds to constant image brightness.

A second class of alternative embodiments comprises variations in the magnitude of the equivalent gain value which corresponds to perceived image brightness. In the discussion of FIGS. 1 and 2 above, the equivalent gain of 2.5 was chosen as illustrative of the intensity of image brightness for one arrangement of off-axis viewing in flight simulation. For other arrangements, the equivalent gain required may be any magnitude, from one up to infinity. The choice of a particular equivalent screen gain magnitude will depend, for example, on the shape of the screen surface, the ambient light conditions, and the amount of interference due to stray light.

The present invention provides a method to provide an off-axis viewer with constant image brightness, independent of changes in the viewing angle.

The first step in the method comprises selecting an equivalent screen gain magnitude. The second step in the method comprises computing the viewing angle from a point on the screen surface. The viewing angle represents the deviation from the normal of the eye line-of-sight. The third step comprises providing a screen gain magnitude at said point which compensates for the diminution in perceived image brightness due to the variance of the viewing angle from the normal.

Specific embodiments of the invention have been described herein which illustrate its suitability for a wide range of applications. It is understood that the utility of the invention is best realized when movement of the trainee is relatively restricted. This ensures the accuracy of the computation of the viewing angle; when the trainee moves, the viewing angle necessarily changes. It has been found that the principles of the present invention can be employed to give very satisfactory results even where the displacement of the trainee is up to six inches in any direction from the theoretical position of the eye location.

The varying gain screen of the present invention extends the utility of non-Lambertian screen surfaces. Heretofore, non-Lambertian screen surfaces provided high gain. These screens, however, could not provide constant image brightness, independent of viewing angle. The principles of the present invention provide for non-Lambertian screen surfaces, having any required magnitude or equivalent gain, maintaining constant image brightness. Moreover, the improved non-Lambertian screen surface can maintain constant image brightness even when there is stray light or perceivable ambient light. These properties of the improved non-Lambertian screen surface make it particularly suitable for employment in flight simulation.

Although specific embodiments of the invention have been described herein, it will be obvious to those skilled in the art that various modifications may be made without departing from the spirit of the invention. With the foregoing in mind, it is understood that the invention is intended to be limited solely by the appended claims.

We claim:

1. An off-axis viewing system that includes a non-Lambertian screen surface to provide an off-axis viewer with constant image brightness as measured by an equivalent gain, independent of changes of a viewing angle, comprising:
    a projector positioned at a first location to provide a projected image on said screen surface;
    means to define a second location which is displaced from said first location, which second location receives substantially all of the refleced light of said projected image;
    means to determine an off-axis viewing angle, said angle defined by a first ray that begins at said first location and ends at a third location on said screen surface, and by a second ray that begins at said second location and ends at said third location;
    a first portion of screen surface encompassing a first predetermined area located at a first viewing angle and having a seleced first screen gain magnitude as measured from the normal of said screen surface;
    a second portion of screen surface encompassing a second predetermined area located at a second viewing angle and having a selected second different screen gain magnitude as measured from the normal of said screen surface;
    said selected first and second screen gain magnitudes each greater than said equivalent gain to provide compensation for the diminution in image brightness caused by the variance of a viewing angle from the normal, whereby said system provides the off-axis viewer with constant image brightness independent of changes of the viewing angle.

2. A screen surface as set forth in claim 1, wherein said screen surface is shaped generally spherically.

3. A screen surface as set forth in claim 2, wherein the image brightness has a variable equivalent screen gain value between one and infinity.

4. In an off-axis viewing system that includes a non-Lambertian screen surface a method for providing constant image brightness as measured by an equivalent gain to a viewer independent of the viewing angle comprising the steps of:
    (a) positioning a projector at a first location to provide a projected image on said screen surface
    (b) defining a second location which is displaced from said first location, which second location receives substantially all of the reflected light of said projected image;
    (c) determining an off-axis viewing angle, said angle defined by a first ray that begins at said first location and ends at a third location on said screen surface, and by a second ray that begins at said second location and ends at said third location;
    (d) providing a first portion of screen surface encompassing a first predetermined area located at a first viewing angle and having a selected first screen gain magnitude as measured from the normal of said screen surface;
    (e) providing a second portion of screen surface encompassing a second predetermined area located at a second viewing angle and having a selected second different screen gain magnitude as measured from the normal of said screen surface; said selected first and second screen gain magnitudes each greater than said equivalent gain and providing compensation for the diminution in image brightness caused by the variance of a viewing angle from the normal.

* * * * *